(12) United States Patent
Thomassin et al.

(10) Patent No.: US 8,707,929 B2
(45) Date of Patent: Apr. 29, 2014

(54) MULTI-ROTOR ROTARY ENGINE ARCHITECTURE

(75) Inventors: Jean Thomassin, Ste-Julie (CA); Richard Ullyott, St-Bruno (CA); André Julien, Ste-Julie (CA)

(73) Assignee: Pratt & Whitney Canada Corp., Longueuil (CA)

( * ) Notice: Subject to any disclaimer, the term of this patent is extended or adjusted under 35 U.S.C. 154(b) by 132 days.

(21) Appl. No.: 13/273,777

(22) Filed: Oct. 14, 2011

(65) Prior Publication Data

US 2013/0025565 A1 Jan. 31, 2013

Related U.S. Application Data

(60) Provisional application No. 61/512,599, filed on Jul. 28, 2011.

(51) Int. Cl.
*F02B 53/00* (2006.01)
*F01C 1/02* (2006.01)

(52) U.S. Cl.
USPC ............................ 123/245; 123/246; 418/61.2

(58) Field of Classification Search
USPC .................. 418/61.2; 123/245–246, 215, 242
See application file for complete search history.

(56) References Cited

U.S. PATENT DOCUMENTS

| | | | |
|---|---|---|---|
| 2,310,269 A | 2/1943 | Waeber | |
| 2,419,305 A | 4/1947 | Woolson et al. | |
| 2,545,458 A | 3/1951 | Ginn | |
| 3,062,435 A * | 11/1962 | Bentele | 418/61.2 |
| 3,077,867 A * | 2/1963 | Froede | 418/60 |
| 3,328,976 A | 7/1967 | Shoemaker et al. | |
| 3,332,404 A | 7/1967 | Lovercheck | |
| 3,370,429 A | 2/1968 | Brice | |
| 3,390,670 A | 7/1968 | Brice | |
| 3,744,940 A * | 7/1973 | Pierce et al. | 418/61.2 |
| 3,768,252 A | 10/1973 | Kubisch et al. | |
| 4,047,856 A * | 9/1977 | Hoffman | 418/61.2 |
| 4,086,038 A * | 4/1978 | Lambrecht | 418/61.2 |
| 4,135,485 A * | 1/1979 | Loyd, Jr. | 123/242 |
| 4,729,726 A * | 3/1988 | Kurio et al. | 418/61.2 |
| 1,900,470 A | 3/1993 | Smith | |
| 5,701,062 A | 12/1997 | Barrett | |
| 5,947,064 A | 9/1999 | Lauritsen | |
| 6,105,542 A | 8/2000 | Efford | |
| 6,138,635 A | 10/2000 | Walker | |
| 6,904,883 B2 | 6/2005 | Snyder et al. | |
| 7,281,513 B1 | 10/2007 | Webb | |
| 2009/0250036 A1 * | 10/2009 | Lauter | 123/221 |
| 2012/0227397 A1 | 9/2012 | Willi et al. | |

FOREIGN PATENT DOCUMENTS

EP 2497902 9/2012

* cited by examiner

*Primary Examiner* — Thai Ba Trieu
*Assistant Examiner* — Ngoc T Nguyen
(74) *Attorney, Agent, or Firm* — Norton Rose Fulbright Canada LLP

(57) ABSTRACT

A multi-rotor internal combustion engine has a plurality of rotary internal combustion units axially distributed along an engine axis. Each unit has a rotor mounted on an eccentric portion of the shaft inside a housing. The housings of adjacent rotary internal combustion units have different angular positions about the engine axis so as to angularly offset the housing from adjacent housings, which may provide for a more uniform temperature distribution around the housings and may also or instead allow optimising of the balancing of pressure induced side loads on the shaft of the rotors.

15 Claims, 4 Drawing Sheets

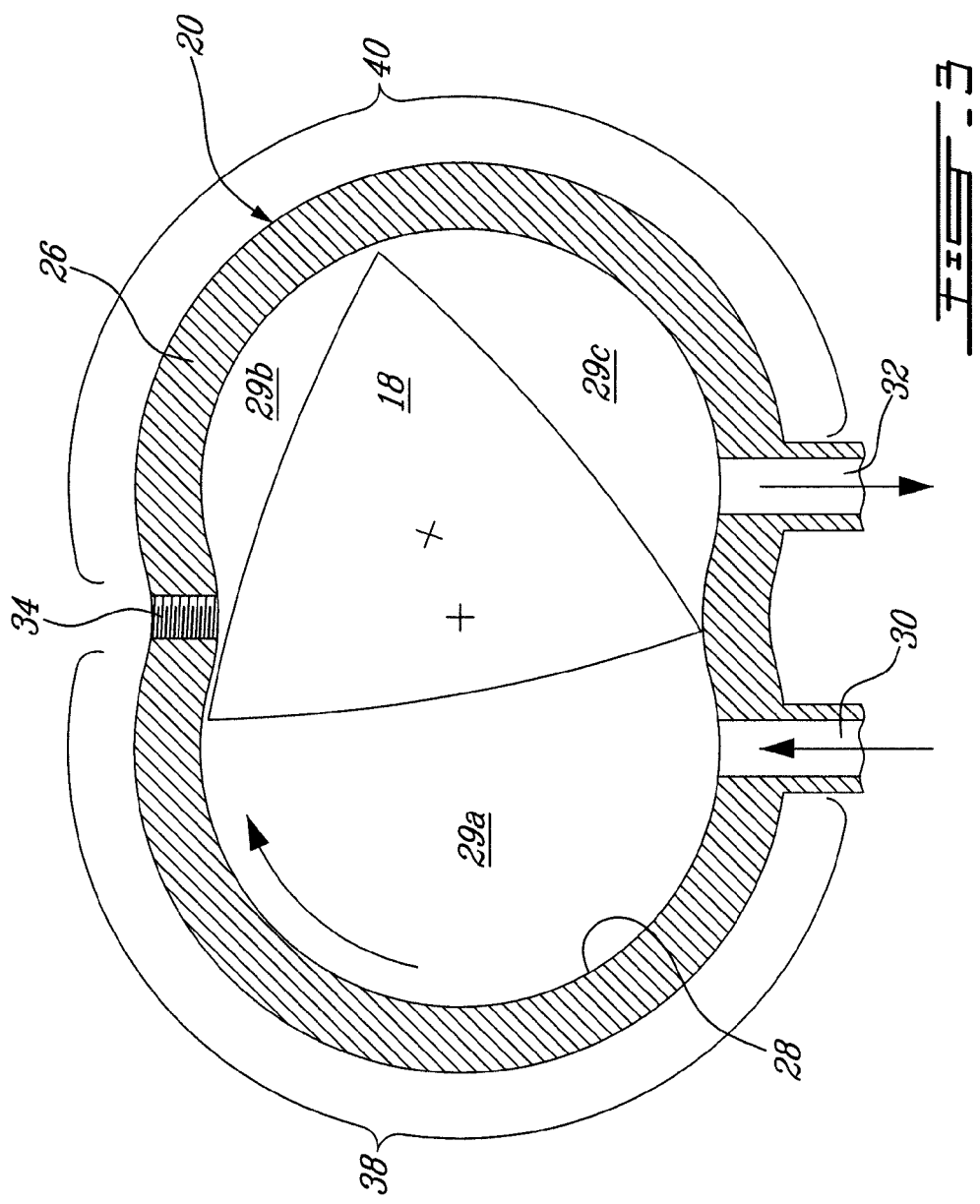

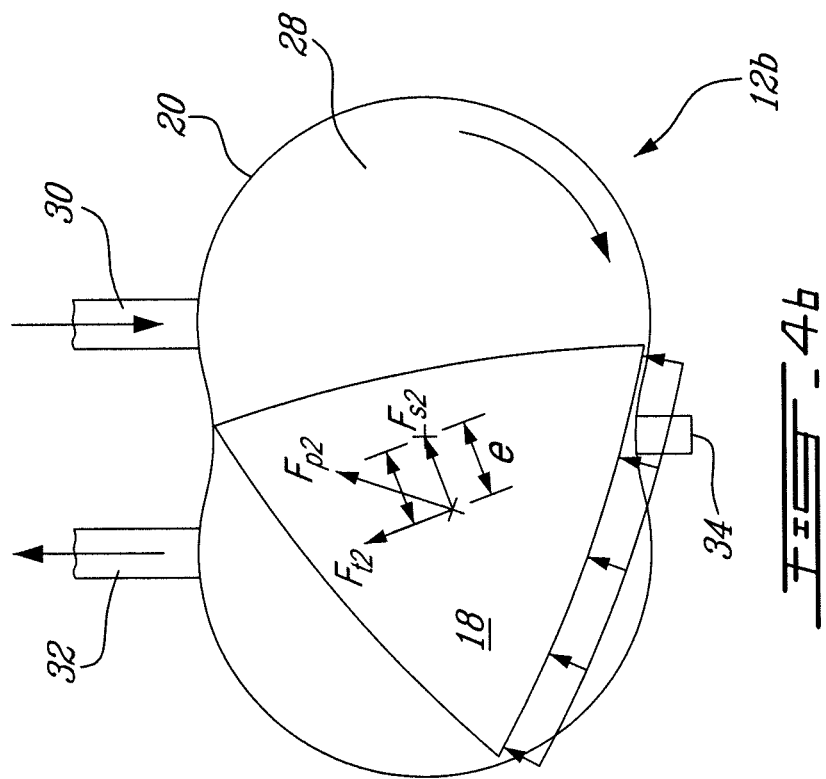
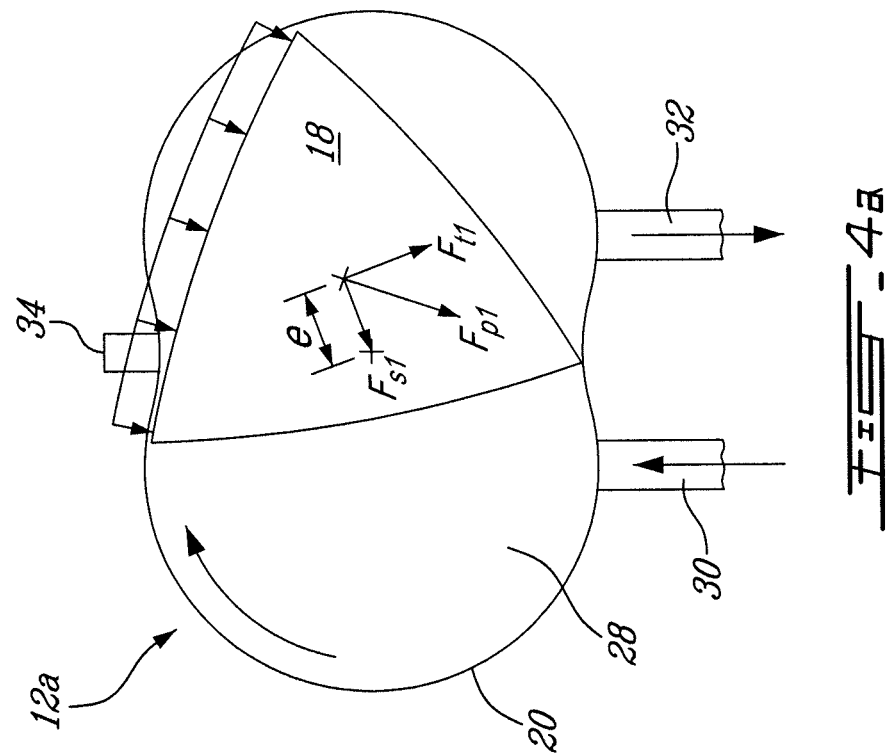

MULTI-ROTOR ROTARY ENGINE ARCHITECTURE

CROSS-REFERENCE TO RELATED APPLICATION

This application claims priority on provisional U.S. application Ser. No. 61/512,599 filed Jul. 28, 2011, the entire contents of which are incorporated by reference herein.

TECHNICAL FIELD

The application relates generally to rotary internal combustion engines and, more particularly, to a multi-rotor internal combustion engine.

BACKGROUND OF THE ART

Unlike a piston engine, where the cylinder is cooled by the incoming charge after being heated by combustion, the rotor housings of rotary combustion engines, such as Wankel engines, are constantly heated on one side and cooled on the other, leading to high local temperatures and unequal thermal expansion around the engine housing. Indeed, in a rotary internal combustion engine, the four different phases of the working cycle-intake, compression, combustion/expansion and exhaust, always occur in their own parts of the housing. The portion of the housing in which the intake and compression phases occur generally forms the "cold region" of the engine, whereas the portion of the housing in which the combustion and the exhaust phases occur generally forms the "hot region" of the engine. Relatively complex cooling schemes may be required to cool the hot regions.

SUMMARY

In one aspect, there is provided a multi-rotor internal combustion engine comprising a plurality of rotary internal combustion units axially distributed along a common axis, each of the rotary internal combustion units having a rotor mounted on an eccentric portion of the shaft inside a housing, the housing having a combustor region where combustion occurs during engine operation, each housing having an angular position about the engine axis different to that of an adjacent housing so that the combustor regions of each housing is angularly offset with respect to said adjacent housing.

In another aspect, there is provided a method of thermally balancing a multi-rotor internal combustion engine comprising a plurality of axially spaced-apart rotary internal combustion units distributed along an engine axis for driving a common eccentric shaft, each rotary combustion units comprising a rotor mounted on an eccentric portion of the eccentric shaft inside a housing, the method comprising clocking adjacent housings at different angular positions about the engine axis so as to generally angularly offset high temperature housing regions of adjacent rotary internal combustion units.

DESCRIPTION OF THE DRAWINGS

Reference is now made to the accompanying figures, in which:

FIG. 3 is a schematic cross-sectional view of one rotary unit of the multi-rotor internal combustion engine; and FIGS. 4a and 4b are schematic cross-sectional view illustrating the compensating effect of two adjacent 180 degrees opposed-combustor rotary units of the multi-rotor engine.

DETAILED DESCRIPTION

Figure 1:
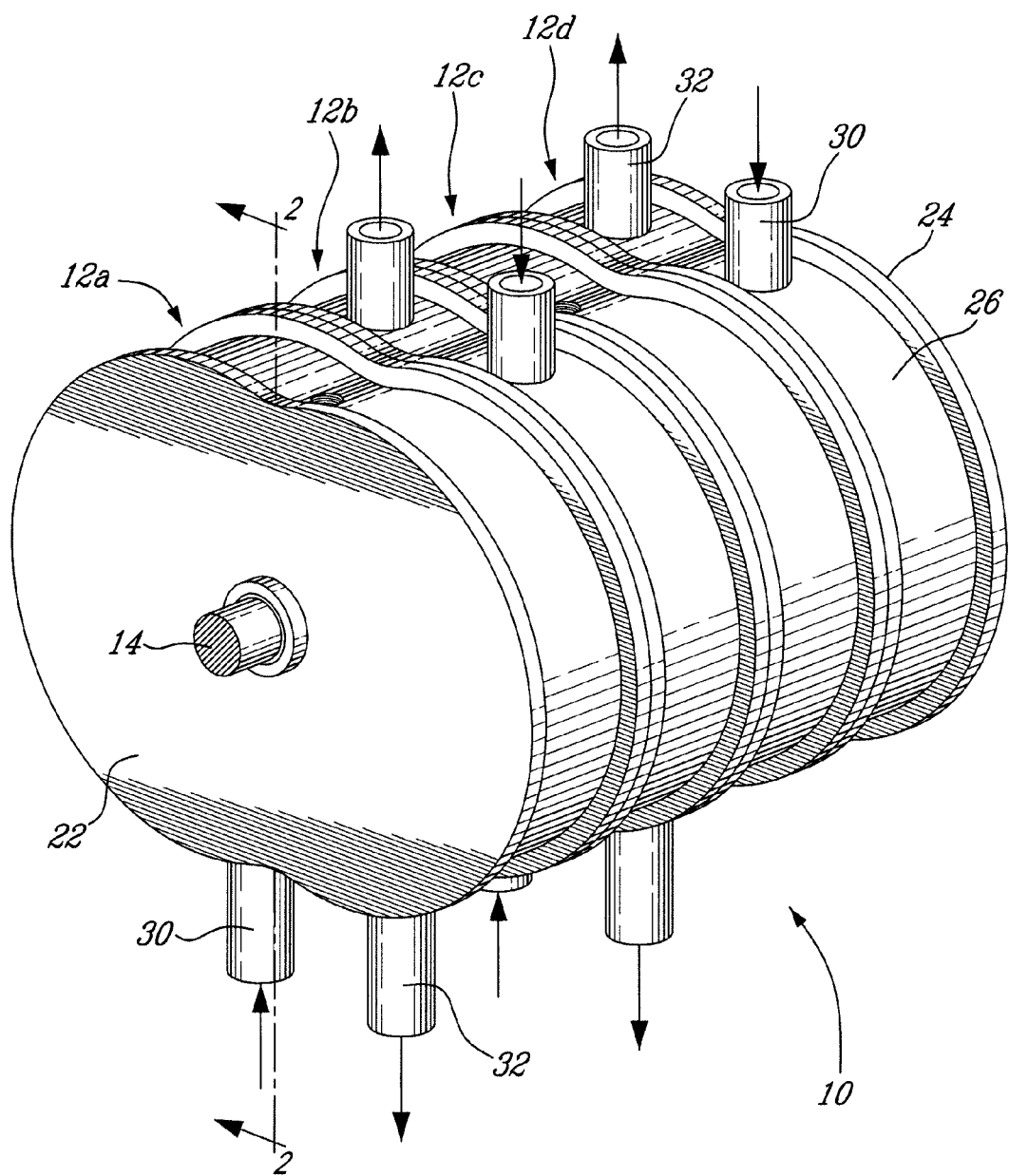
FIG. 1 is a schematic perspective view of a multi-rotor internal combustion engine including a plurality of rotary units driving a common eccentric shaft.

FIG. 1 illustrates a multi-rotor internal combustion engine 10 suited for aircraft applications. The engine 10 comprises a plurality of similar axially aligned rotary units 12a, 12b, 12c and 12d driving a common eccentric shaft 14. While four units are illustrated in FIG. 1, it is understood that the engine 10 could comprise any suitable plural number of units. As will be seen hereinafter, the relative angular positions of adjacent rotary units 12 about the engine axis 16 (FIG. 2) are selected to balance the housing thermal loads and/or the drive train unsteady pressure loads.

Figure 2:
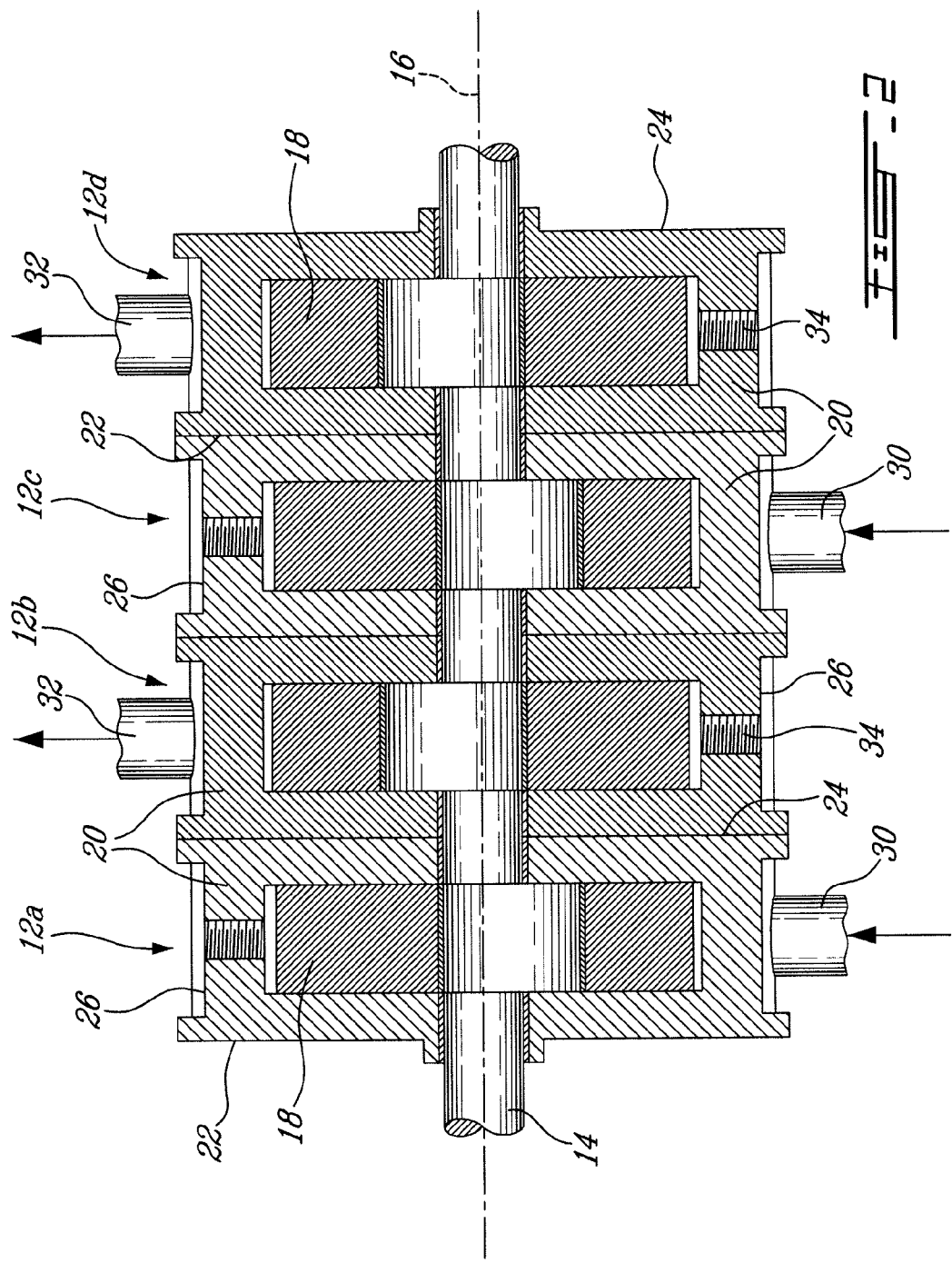
FIG. 2 is a schematic cross-sectional view of the multi-rotor internal combustion engine shown in FIG. 1.

As shown in FIG. 2, each rotary unit 12a, 12b, 12c and 12d may be provided in the form of a Wankel type engine comprising a triangularly shaped rotor 18 mounted in a fixed housing 20. Each housing 20 has axially spaced-apart end faces 22 and 24 and a peripheral wall 26 extending therebetween and surrounding the rotor 18. As can be appreciated from FIG. 3, the wall 26 has an inner surface which generally defines an oval-like epitrochoid chamber 28. The rotor 18 is received in the chamber 28 for planetary motion. The rotor 18 rides on an eccentric portion of shaft 14. The rotor 18 both rotates around the eccentric portion and make orbital revolutions around the shaft 14. Seals (not shown) at the apexes of the rotor 18 seal against the inner surface of peripheral wall 26 of the housing 20, dividing it into three "moving" variable-volume working chambers 29a, 29b and 29c. The rotation of the rotor 18 on its own axis is caused and controlled by a pair of synchronizing gears (not shown). As known in the art, a fixed gear may be mounted on one end wall of the housing 20 to engage a ring gear attached to the rotor 18 and ensure the rotor moves ⅓ turn for each turn of the eccentric shaft. Other speed ratios are contemplated as well.

As shown in FIG. 3, each housing 20 has an intake port 30 for admitting a fuel-air mixture to a first one of the three variable-volume working chambers defined between the rotor 18 and wall 26. The intake port 30 may be defined at an appropriate circumferential location in the peripheral wall 26. An exhaust port 32 is provided for expelling the combustion gases. The exhaust port 32 may be defined in the wall 26 adjacent to the intake port 30. An ignition system, which may include one or more spark plug 34 or other suitable ignition source, may be provided for igniting the fuel-air mixture. The spark plug 34 is disposed at an intermediate circumferential location between the intake and the exhaust ports 30 and 32 relative to rotation direction of the rotor 18.

As discussed above, engines such as the Wankel are constantly heated on one side and cooled on the other, leading to high local temperatures and unequal thermal expansion around the engine housing. Consequently, the alignment of hot regions of successive rotor housings in multi-rotor internal combustion engines would create thermal distortions and coning problems requiring relatively complex cooling schemes. Also, the cumulative effect of the rotor pressure induced side loads of the rotors on the engine shaft creates dynamic imbalances which may not be acceptable in certain applications, such as in airborne use. The present arrangement may assist in compensating for such problems, as will now be described.

Each rotary unit 12a, 12b, 12c and 12d has a four stroke-cycle including intake, compression, combustion/expansion and exhaust phases. The intake phase, the compression phase, the combustion/expansion phase and the exhaust phase individually take place in their own regions of the housing. That is each individual phase of the cycle always occurs in the same region or part of the housing 20. This results in a non-uniform temperature distribution around the housing 20. The housing region 38 extending generally circumferentially from the intake port 30 to the spark plug 34, where the intake and compression phases occur, is less thermally solicited and can be viewed as the low temperature side or region of the rotary unit. The housing region 40 extending generally circumferentially from the spark plug 34 to the exhaust port 32, where the combustion/expansion and the exhaust phases occur, is more thermally solicited and can be viewed as the high temperature side or region of the rotary unit.

As shown in FIGS. 1 and 2, the multi-unit rotary engine 10 can be thermally balanced by clocking adjacent rotary units 12a, 12b, 12c and 12d so as to generally align the high temperature housing region 40 of a given rotary unit with the low temperature housing region 38 of an adjacent rotary unit. This can be accomplished by angularly positioning the housing 20 of adjacent rotary units 12a, 12b, 12c and 12d at 180 degrees to each other relative to the engine main axis. As shown in FIGS. 1 and 2, it results in the intake and exhaust ports 30 and 32 of adjacent units facing each other from opposed sides of the housings. By doing so, the high temperature regions 40 of the first and second rotary units 12a and 12b are offset by 180 degrees. Likewise, the high temperature region 40 of the second rotary unit 12b is offset from the high temperature region 40 of the third rotary unit 12c by 180 degrees. The same holds true for the relative angular positions of the hot temperature regions 40 of the third and fourth rotary units 12c and 12d. By so opposing the combustor regions of the adjacent rotary units, it may be possible to partially or fully compensate for the housing distortion effect that the thermal gradient would otherwise have on the overall assembly if the housings of the rotary units would have all the same angular position relative to the engine axis 16.

A suitable manifold (not shown) is provided to accommodate the opposite orientation of the intake and exhaust ports 30 and 32 from one housing to the next. It is also understood that an appropriate cooling system (not shown), such as an air cooling system, an oil cooling system or a combination thereof, may be provided to remove heat from the housings 20. "Cold" sections may at least partially cool adjacent "hot" sections, which may simplify cooling as well.

The force of gas pressure on the rotor 18 of each of the rotary units 12a, 12b, 12c and 12d during the combustion phase is reacted generally at the center of the eccentric portions of the eccentric shaft 14. The opposed combustor rotary architecture can be used so that the side forces exerted by the rotors 18 on the shaft 14 reduce or altogether cancel each other. FIGS. 4a and 4b illustrate one example of the pressure induced force balance resulting from the opposed combustor architecture on two adjacent units, units 12a and 12b for example. More particularly, FIG. 4a shows the resulting forces on the rotor 18 during the combustion phase for the first rotary unit 12a. FIG. 4b shows the resulting force on the rotor 18 during the combustion phase for the second rotary unit 12b. The first and second rotary units 12a and 12b are synchronized to be fired simultaneously. It can be appreciated that the opposed compression, combustion and expansion chambers (the 180 degrees angular offset between the first and second units 12a and 12b) are self-compensating for the pressure side loads ($F_S=F_{S1}+F_{s2}=0$) when the adjacent rotary units 12a and 12b are fired simultaneously. That is the pressure side loads on the rotor 18 of the first unit 12a are reduced or altogether cancelled by the pressure side loads on the rotor 18 of the second units 12b. The output shaft torque "T" is equal to $(F_{t1}+F_{t2}) \times e$; where $F_{t1}$ is the torque force of the first unit 12a, $F_{t2}$ is the torque force of the second unit 12b and "e" is the eccentric distance. The sum of side force $F_t$ and of the torque force $F_S$ corresponds to the pressure force $F_p$ exerted by the working fluid on the rotor 18 of each of the rotary units 12a and 12b.

The pressure side loads on the shaft 14 can be self-compensated by stacking the rotary units two-by-two at 180 degrees, three-by-three at 120 degrees or four-by-four at 90 degrees, and so on, or in other suitable offset arrangements to optimize between housing/drive train balance and acceptable output shaft torque pulse amplitude.

The above description is meant to be exemplary only, and one skilled in the art will recognize that changes may be made to the embodiments described without departing from the scope of the invention disclosed. For example, it is understood that the above disclosed engine architecture may be applicable to any suitable type of rotary engines, single rotating, oscillatory rotating and/or planetary rotating engines. It may also be applicable to any other suitable structure of rotary engine within a given type, for example dual, triple, quadruple chamber structure of the planetary type rotary engine. Still other modifications which fall within the scope of the present invention will be apparent to those skilled in the art, in light of a review of this disclosure, and such modifications are intended to fall within the appended claims.

What is claimed is:

1. A method of thermally balancing a multi-rotor internal combustion engine comprising a plurality of axially spaced-apart rotary internal combustion units distributed along an engine axis for driving a common eccentric shaft, each rotary combustion units comprising a rotor mounted on an eccentric portion of the eccentric shaft inside a housing, the method comprising clocking adjacent housings at different angular positions about the engine axis and angularly offsetting high temperature housing regions of adjacent rotary internal combustion units by 180 degrees.

2. The method defined in claim 1, comprising providing the combustion units in at least one group, and clocking the rotors of adjacent combustion units of the group at an angle corresponding to 360 degrees divided by the number of units in the group.

3. The method defined in claim 1, wherein each housing has a combustor region where combustion take place during engine operation, wherein clocking the adjacent housings comprises angularly opposing the combustors regions of the adjacent housings.

4. The method defined in claim 1, wherein each housing has an inlet port and an outlet port located on a same side of the housing, and wherein the rotary units are clocked such that the inlet and outlet ports of adjacent housings are disposed on opposed sides of the engine.

5. The method defined in claim 1, comprising simultaneously firing the rotary internal combustion units.

6. A multi-rotor internal combustion engine comprising a plurality of rotary internal combustion units axially distributed along a common axis, each of the rotary internal combustion units having a housing with an internal cavity having an epitrochoid shape with two lobes defined therein and a rotor with three circumferentially spaced apex portions received in sealing engagement within the internal cavity, each housing being angularly offset at 180 degrees with respect to the housing of each adjacent one of the rotary internal combustion units.

7. The engine defined in claim 6, wherein the two lobes of each housing include a first lobe extending generally from an ignition element to an exhaust port of the housing and a second lobe extending generally from an in intake port of the housing to the ignition element, the first lobe of each housing being aligned with the second lobe of the housing of each adjacent one of the combustion units.

8. The engine defined in claim 7, wherein the intake port and the exhaust port of each housing are located on a same side of the housing, and wherein the intake and exhaust ports of adjacent housings are disposed on opposed sides of the engine.

9. The engine defined in claim 6, wherein each rotor is stacked at 180 degrees about the common axis relative to the rotor of each adjacent one of the combustion unit.

10. The engine defined in claim 6, wherein the combustion units are provided in at least one group, and each rotor is angularly offset from to rotor of each respective adjacent combustion unit of the group by an angle corresponding to 360 degrees divided by the number of units in the group.

11. The engine defined in claim 6, wherein each rotary internal combustion units has an intake phase, a compression phase, a combustion phase and an exhaust phase, and wherein each housing has a low temperature region corresponding to the region where the intake and compression phases take place, each housing having a high temperature region corresponding to the region where the combustion and exhaust phases take place, and wherein the hot regions of adjacent housings are angularly opposed to each other about the common axis.

12. A multi-rotor internal combustion engine comprising a plurality of rotary internal combustion units axially distributed along a common axis, each of the rotary internal combustion units having a rotor mounted on an eccentric portion of the shaft inside a respective housing, wherein each respective housing comprises:
  a combustor region where combustion occurs during engine operation, angularly offset at 180 degrees with respect to the combustor region of an adjacent housing about the common axis and
  intake and exhaust ports of one of the rotary internal combustion units, wherein the intake and exhaust ports of said one of the rotary internal combustion units, located on one side of the respective housing, are opposed to the intake and exhaust ports of an adjacent one of the rotary internal combustion units.

13. The multi-rotor internal combustion engine defined in claim 12, wherein each rotor is stacked at 180 degrees about the common axis relative to the rotor of each respective adjacent combustion unit.

14. The multi-rotor internal combustion engine defined in claim 12, wherein the combustion units are provided in at least one group, and each rotor is angularly offset from to rotor of each respective adjacent combustion unit of the group by an angle corresponding to 360 degrees divided by the number of units in the group.

15. The multi-rotor internal combustion engine defined in claim 12, wherein each of the rotary internal combustion units has an intake phase, a compression phase, a combustion phase and an exhaust phase, and wherein each housing has a low temperature region corresponding to the region where the intake and compression phases take place, each housing having a high temperature region corresponding to the region where the combustion and exhaust phases take place, and wherein the hot regions of adjacent housings are angularly opposed to each other about the common axis.

\* \* \* \* \*